L. PLANER.
DEVICE FOR CONVERTING MOTION.
No. 28,403. Patented May 22, 1860.
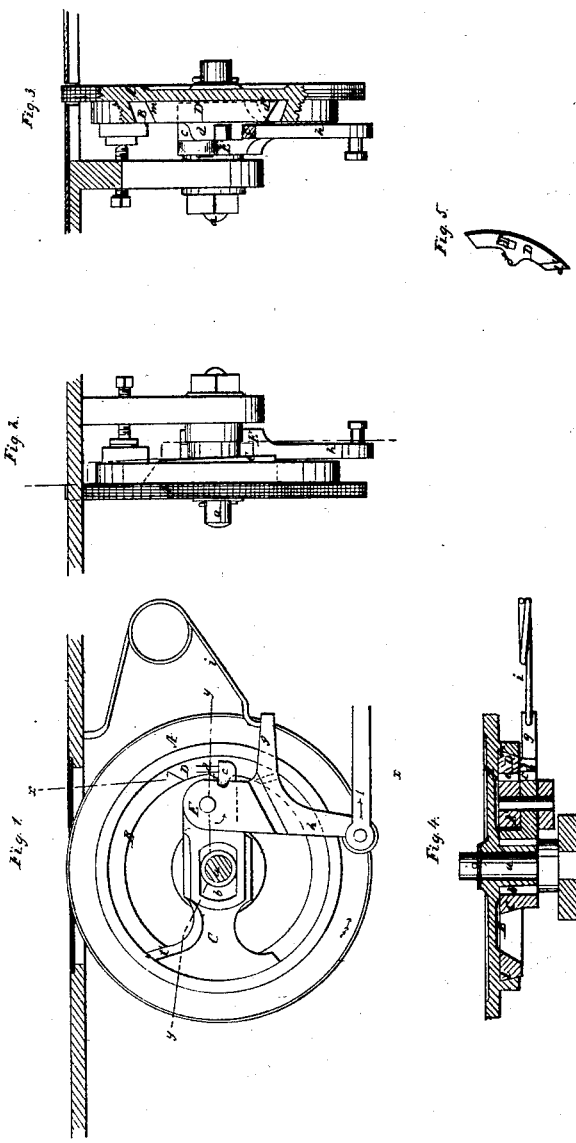
Witnesses:
Inventor:

UNITED STATES PATENT OFFICE.

LOUIS PLANER, OF NEW YORK, N. Y.

IMPROVEMENT IN CONVERTING MOTION.

Specification forming part of Letters Patent No. 28,403, dated May 22, 1860.

*To all whom it may concern:*

Be it known that I, LOUIS PLANER, of the city, county, and State of New York, have invented a new and Improved Device for Converting Reciprocating Rectilinear in Intermittent Rotary Motion; and I do hereby declare that the following is a full, clear, and exact description of the same, reference being had to the accompanying drawings, forming a part of this specification, in which—

Figure 1 represents a front elevation of my invention, some portion being removed to expose the working parts. Fig. 2 is an elevation of the same from one side. Fig. 3 is a sectional elevation of the same from the other side, the line $x\ x$, Fig. 1, indicating the plane of section. Fig. 4 is a horizontal section of the same, taken in the plane indicated by the line $y\ y$, Fig. 1. Fig. 5 is a detached view of one of the working parts.

Similar letters of reference in the several figures indicate corresponding parts.

This invention consists, first, in the employment of a hinged oscillating cam, in combination with two dogs operating in a grooved wheel in such a manner that in moving said cam in one direction the dogs are forced against the sides of the grooved wheel, and the wheel is caused to partake of the motion of the dogs, whereas in moving the cam in the other direction the dogs are released and allowed to move independent from the wheel; second, in arranging said dogs with V-shaped edges to fit into a corresponding V-shaped groove in the wheel, whereby said dogs are caused to retain their places without any further assistance, and at the same time the pressure exerted by the dogs on the sides of the groove is equally divided over the working-surfaces, causing a uniform wear all over; third, in giving to the advancing corners of the dogs the shape of knife-edges sweeping close over the bottom of the groove in the wheel, so that all dirt or grease which may settle in the interior of the groove is scraped off and caused to discharge itself over the sides of the grooved wheel; fourth, in arranging one or both of said dogs with sloping surfaces, whereby the rear edge of the dog is caused to project beyond the edge of the grooved wheel, so that all dirt which may be scraped off by the knife-edged corners of the dog or dogs is caused to be discharged over the sides of the grooved wheel.

To enable those skilled in the art to make and use my invention, I will proceed to describe its construction and operation with reference to the drawings.

A represents a wheel, which turns on a pivot or arbor, $a$. A groove or recess, B, is turned into its side, and two dogs, C D, are placed loosely into said recess. The dog C is retained by a slot, $b$, fitting over the pivot $a$, and a nose, $c$, which extends from the same by coming in contact with a lug, $d$, on the upper surface of the dog D, retains the latter. A cam, E, is hinged to the end of the dog C, and a recess, $e$, in the edge of this cam serves to receive a nose, $f$, projecting from the inner edge of the dog D. This cam is thus firmly united with the dog C, and it is so arranged that on turning the same in the direction of the arrow marked on it in Fig. 1 the two dogs are forced apart, so as to grip the sides of the recess or groove B in the wheel A, and cause the latter to partake of any motion which may be imparted to the dogs; but if the cam is turned in the direction opposite to the arrow marked thereon in Fig. 1 the dogs release the sides of the recess, and they are then allowed to recede without imparting any motion to the wheel A.

The recess B is turned in, so as to present the shape of a V, as clearly shown in Fig. 4, and the edges $l\ m$ of the dogs C D are made to correspond to this shape, so that any pressure which causes them to bind against the sides of the recess has a tendency to force the edges of the dogs down toward the inner corner of the recess, thereby dividing the pressure equally over the rubbing surfaces. When the edges of the grooves and of the dogs are made square, the dogs will always have a tendency to be forced out of the groove, and the rubbing surfaces will wear more in one place than in the other. With my arrangement of the V-shaped edges the dogs are retained in the recess and the rubbing surfaces wear uniformly all over.

The advancing corners $c'\ d'$ of my dogs are made in the form of knife-edges, which sweep close over the bottom of the recess or groove B, so that any dirt or grease which may accumulate in said recess is scraped off and caused to roll down over the edge of the wheel; and to prevent the dirt from dropping into the recess as as it rolls over the dogs I have made the upper surface of the same, or of the dog C alone, sloping down toward the advancing corners, as clearly shown in Fig. 2, so that all the dirt which may be scraped off by the knife-edge $c'$ is caused to drop over the edge of the recess B.

This device is particularly adapted to operate the feed-wheel of a sewing-machine, and in this case the cam E is furnished with the arms $g\ h$, the arm $g$ being subjected to the pressure of a spring, $i$, which serves to throw the cam in such a position as to release the dogs C D, and the arm $h$ to connect with the driving-shaft, so that by its action the same receives the required oscillating motion. By moving the arm $h$ in the direction of arrow 1 the dogs C D are forced apart, and the wheel A is caused to rotate in the direction of the arrow marked thereon in Fig. 1. On releasing the arm $h$, the cam, together with the dogs, is forced back to its original position by the action of the spring $i$, ready for a new hold.

It is obvious that this device may be used in all cases where it is desired to convert reciprocating rectilinear into intermittent rotary motion, and it will be found of great advantage, as the peculiar shape given to the working-surfaces causes the same to wear quite uniformly.

What I claim as new, and desire to secure by Letters Patent, is—

1. The employment of the hinged cam E, in combination with the dogs C D and grooved wheel A, constructed and operating as and for the purpose described.

2. Arranging the dogs C D with V-shaped edges $l\ m$, to fit into a corresponding V-shaped groove or recess, B, in the wheel A, substantially in the manner and for the purpose specified.

3. Giving to the advancing corners $c'\ d'$ of the dogs C D the shape of knife-edges, substantially as and for the purpose set forth.

4. Arranging the surface of the dog C in such a manner that its rear edge projects above the upper edge of the recess B, and that all the dirt scraped off by the advancing corner $c'$ is caused to discharge over the wheel A, substantially as described.

LOUIS PLANER.

Witnesses:
 W. EMERSON,
 F. GATTERDAME.